United States Patent
Bhora et al.

(10) Patent No.: US 7,895,506 B2
(45) Date of Patent: Feb. 22, 2011

(54) ITERATIVE DECODER WITH EARLY-EXIT CONDITION DETECTION AND METHODS FOR DECODING

(75) Inventors: Veerendra Bhora, Sunnyvale, CA (US); Raghavan Sudhakar, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 1100 days.

(21) Appl. No.: 11/612,350

(22) Filed: Dec. 18, 2006

(65) Prior Publication Data
US 2008/0148125 A1    Jun. 19, 2008

(51) Int. Cl.
    *H03M 13/03*    (2006.01)
(52) U.S. Cl. ..................... 714/794; 714/795
(58) Field of Classification Search ............ 714/794, 714/795
    See application file for complete search history.

(56) References Cited

U.S. PATENT DOCUMENTS

| | | | | |
|---|---|---|---|---|
| 4,894,845 A * | 1/1990 | Janssen et al. | ............ | 375/329 |
| 4,905,254 A * | 2/1990 | Bergmans | ............ | 375/233 |
| 4,953,183 A * | 8/1990 | Bergmans et al. | ............ | 375/348 |
| 5,128,969 A * | 7/1992 | Baghdady | ............ | 375/347 |
| 5,339,334 A * | 8/1994 | Baghdady | ............ | 375/347 |
| 5,483,557 A * | 1/1996 | Webb | ............ | 375/349 |
| 5,862,189 A * | 1/1999 | Huisken et al. | ............ | 375/341 |
| 6,072,779 A * | 6/2000 | Tzannes et al. | ............ | 370/252 |
| 6,246,698 B1 * | 6/2001 | Kumar | ............ | 370/487 |
| 6,516,437 B1 * | 2/2003 | Van Stralen et al. | ......... | 714/755 |
| 6,526,531 B1 * | 2/2003 | Wang | ............ | 714/704 |
| 6,591,390 B1 * | 7/2003 | Yagyu | ............ | 714/755 |
| 6,675,342 B1 * | 1/2004 | Yagyu | ............ | 714/755 |
| 6,731,595 B2 * | 5/2004 | Matsumoto | ............ | 370/210 |
| 6,865,708 B2 * | 3/2005 | Wang | ............ | 714/758 |
| 6,904,555 B2 * | 6/2005 | Nagase et al. | ............ | 714/751 |
| 7,046,617 B2 * | 5/2006 | Rotstein et al. | ............ | 370/203 |
| 7,046,694 B2 * | 5/2006 | Kumar | ............ | 370/487 |
| 7,127,656 B2 * | 10/2006 | Van Stralen et al. | ......... | 714/755 |
| 7,249,304 B2 * | 7/2007 | Yu et al. | ............ | 714/755 |
| 7,444,582 B1 * | 10/2008 | Au et al. | ............ | 714/784 |
| 7,613,256 B2 * | 11/2009 | van Veen et al. | ............ | 375/340 |

OTHER PUBLICATIONS

Ngatched, T.M.N.; Takawira, F.; , "Simple stopping criterion for turbo decoding," Electronics Letters, vol. 37, No. 22, pp. 1350-1351, Oct. 25, 2001.*

Chun Ling Kei; Wai Ho Mow; , "Improved stopping criteria for iterative decoding of short-frame multi-component turbo codes," Communications, Circuits and Systems and West Sino Expositions, IEEE 2002 International Conference on, vol. 1, No., pp. 42-45 vol. 1, Jun. 29-Jul. 1, 2002.*

(Continued)

*Primary Examiner*—Joseph D Torres
(74) *Attorney, Agent, or Firm*—Schwegman, Lundberg & Woessner, P.A.; Gregory J. Gorrie (57) ABSTRACT

Embodiments of an iterative decoder with early-exit condition detection and methods for decoding are generally described herein. Other embodiments may be described and claimed. In some embodiments, a first codeword is generated from decoded bits after one or more half-iterations of an iterative decoder, a second codeword from decoded bits after an additional half-iteration of the iterative decoder, and the first and second codewords are compared to determine whether the decoded bits are valid. In some embodiments, double or triple codeword matching is selected based on an estimated signal-to-noise ratio (SNR) and the modulation level.

12 Claims, 5 Drawing Sheets

OTHER PUBLICATIONS

R.Y. Shao, S. Lin and M.P.C. Fossorier, "Two Simple Stopping Criteria for Turbo Decoding", IEEE Transactions on Comm., vol. 47, No. 8, pp. 1117-1120, Aug. 1999.*

"IEEE Standard for Local and Metropolitan Area Networks—Part 16: Air Interface for Fixed and Mobile Broadband Wireless Access Systems, Amendment 2: Physical and Medium Access Control Layers for Combined Fixed and Mobile Operation in Licensed Bands and", *IEEE Std. 802.16e-2005 and IEEE Std. 802.16tm-2004/Cor1-2005* (*Amendment and Corrigendum to IEEE 802.16-2004*), (2006), 864 pgs.

"Telecommunications and Mission Operations Directorate—DSN Technology Program—Communications Systems Analysis: Turbo Codes", [online]. JPL, NASA. [archived on Oct. 9, 2000]. Retrieved from the Internet: <URL: http://web.archive.org/web/20001009130623/http://www331.jpl.nasa.gov/public/TurboForce.GIF>, 1 pg.

Berrou, C., et al., "Near Shannon Limit Error-Correcting Coding and Decoding: Turbo-Codes. 1", *Technical Program, Conference Record, IEEE International Conference on Communications (ICC '93)*, vol. 2, (May 1993), 1064-1070.

Shibutani, A., et al., "Complexity Reduction of Turbo Decoding", *Proceedings, IEEE 50th Vehicular Technology Conference (VTC 1999)*, (1999), 1570-1574.

* cited by examiner

INPUT CIRCUITRY

*FIG. 2B*

CIRCUITRY TO BUFFER AND COMPARE

ITERATIVE DECODER WITH EARLY-EXIT CONDITION DETECTION AND METHODS FOR DECODING

TECHNICAL FIELD

The present invention pertains to iterative error-correcting decoding operations in both wired and wireless communication systems. Some embodiments pertain to multicarrier communications, such as orthogonal frequency division multiplexed (OFDM) communication systems. Some embodiments pertain to single-carrier communication systems. Some embodiments pertain to turbo decoding in Worldwide Interoperability for Microwave Access (WiMax) receivers.

BACKGROUND

In many communication systems, a transmitter encodes bits with error-correcting codes before transmission. The error-correcting codes help correct for errors that occur during transmission through the channel. At the receiver, an error-correcting decoder is used to decode the signals and generate decoded bits corresponding to the original transmitted bits. Some conventional receivers employ iterative decoders, such as turbo decoders, that perform an iterative process to decode the received signals. This iterative process is processing intensive consuming excessive amounts of time and energy. This is undesirable particularly for portable and battery powered wireless communication devices.

Thus, there are general needs for reducing processing time and energy consumption in portable and battery powered communication devices. There are also general needs for decoders suitable for use in receivers that perform error-correcting decoding in less time and/or with lower energy consumption.

DETAILED DESCRIPTION

The following description and drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1A:
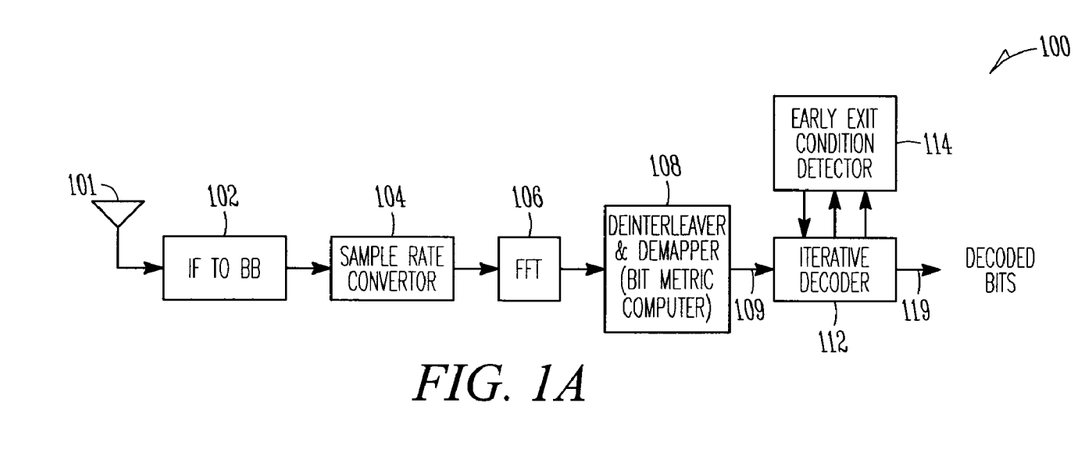
FIGS. 1A, 1B and 1C are block diagrams of OFDM receivers in accordance with some embodiments of the present invention.

FIG. 1A is a block diagram of an OFDM receiver in accordance with some embodiments of the present invention. OFDM receiver 100 comprises intermediate frequency (IF) to baseband (BB) conversion circuitry 102 to convert signals received through antenna 101 to time-domain baseband signals. OFDM receiver 100 also comprises sample rate converter 104 to sample the time-domain baseband signals to provide digital time-domain samples. OFDM receiver 100 also comprises Fourier transform circuitry 106 to convert the digital time-domain samples to the frequency domain. In some embodiments, Fourier transform circuitry 106 may provide a frequency-domain symbol for each subcarrier of the received OFDM signals. In some embodiments, Fourier transform circuitry 106 may comprise Fast Fourier transform (FFT) circuitry, although the scope of the invention is not limited in this respect. Each frequency-domain symbol generated by Fourier transform circuitry 106 may represent a number of bits depending on the modulation level used by the transmitter. In some embodiments, OFDM receiver 100 may also comprise deinterleaver and demapper circuitry 108 for generating bit metrics 109 (e.g., soft bits) from the frequency-domain symbols provided by Fourier transform circuitry 106. In some embodiments, deinterleaver and demapper circuitry 108 may generate a single stream of soft bits from the plurality of the frequency-domain symbols provided by Fourier transform circuitry 106. OFDM receiver 100 may also include iterative decoder 112 and early-exit condition detector 114 to generate decoded bits 119 from bit metrics 109 by performing an iterative decoding process.

In some embodiments, iterative decoder 112 may exit the iterative decoding process early when codewords generated from two or more half-iterations of iterative decoder 112 match. In some embodiments, early-exit condition detector 114 may generate a first codeword from decoded bits generated after one or more half-iterations of iterative decoder 112 and may generate a second codeword from decoded bits generated after an additional half-iteration of iterative decoder 112. Early-exit condition detector 114 may compare the first and second codewords to determine whether the decoded bits are valid.

In some embodiments, when the first and second codewords match and when iterative decoder 112 is configured to perform double codeword matching, early-exit condition detector 114 may indicate that the decoded bits comprise valid decoded bits and iterative decoder 112 may refrain from performing further iterations for the current input bits.

In some embodiments, when the first and second codewords match and when iterative decoder 112 is configured to perform triple codeword matching, a third codeword may be generated from another additional half-iteration of iterative decoder 112. Early-exit condition detector 114 may compare the third codeword to the first and second codewords. Iterative decoder 112 may refrain from performing further iterations for the current input bits when the third codeword matches both the first and second codewords. Early-exit condition detector 114 may indicate to iterative decoder 112 that the decoded bits comprise valid decoded bits.

In some embodiments, a codeword matching level may be set to configure iterative decoder 112 and early-exit condition detector 114 to perform either double or triple codeword matching based on a signal-to-noise ratio (SNR) estimate. The iterative decoding and early-exit condition detection processes performed by iterative decoder 112 and early-exit condition detector 114 are discussed in more detail below.

Figure 1B:
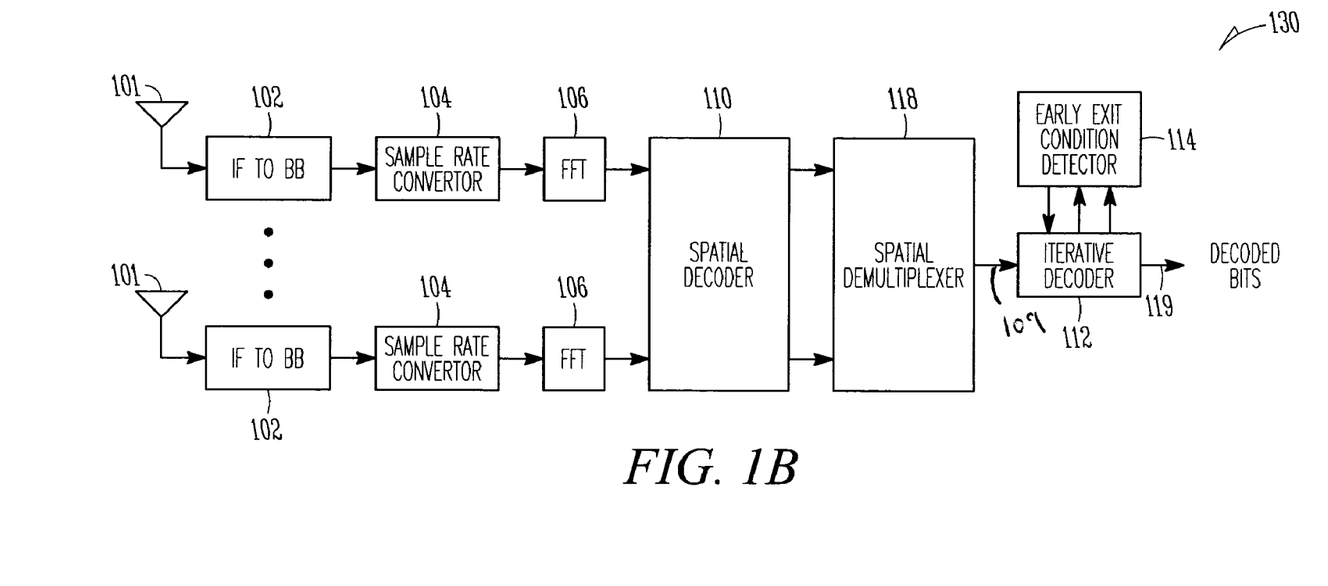

FIG. 1B is a block diagram of a multiple-input multiple-output (MIMO) OFDM receiver in accordance with some embodiments of the present invention. In these embodiments, MIMO OFDM receiver 130 may use two or more antennas 101 to receive signals through separate receive-signal paths. MIMO OFDM receiver 130 comprises spatial decoder 110 to separate the different spatial streams and generate outputs for each spatial stream. In these embodiments, spatial decoder 110 may weight and combine the frequency domain signals provided by each FFT circuitry 106 and generate a single symbol stream corresponding to each transmitted stream. MIMO OFDM receiver 130 may also include spatial demultiplexer 118 to combine the streams provided by spatial decoder 110 into a single stream of bit metrics 109. In these embodiments, two or more streams of bit metrics may be converted to a single soft-bit stream.

In these embodiments, the two or more separate bit streams may be transmitted by a transmitting station. For example, the transmitting station may transmit separate bit streams with separate transmit antenna (i.e., a different information symbol may be transmitted by each transmit antenna). In some embodiments, the transmitting station may transmit vertically encoded signals in which the bit stream to be transmitted is encoded, mapped, and demultiplexed into multiple transmission symbols. The transmission symbols may then be demultiplexed into several bit streams and transmitted on a corresponding transmit antenna.

Figure 1C:
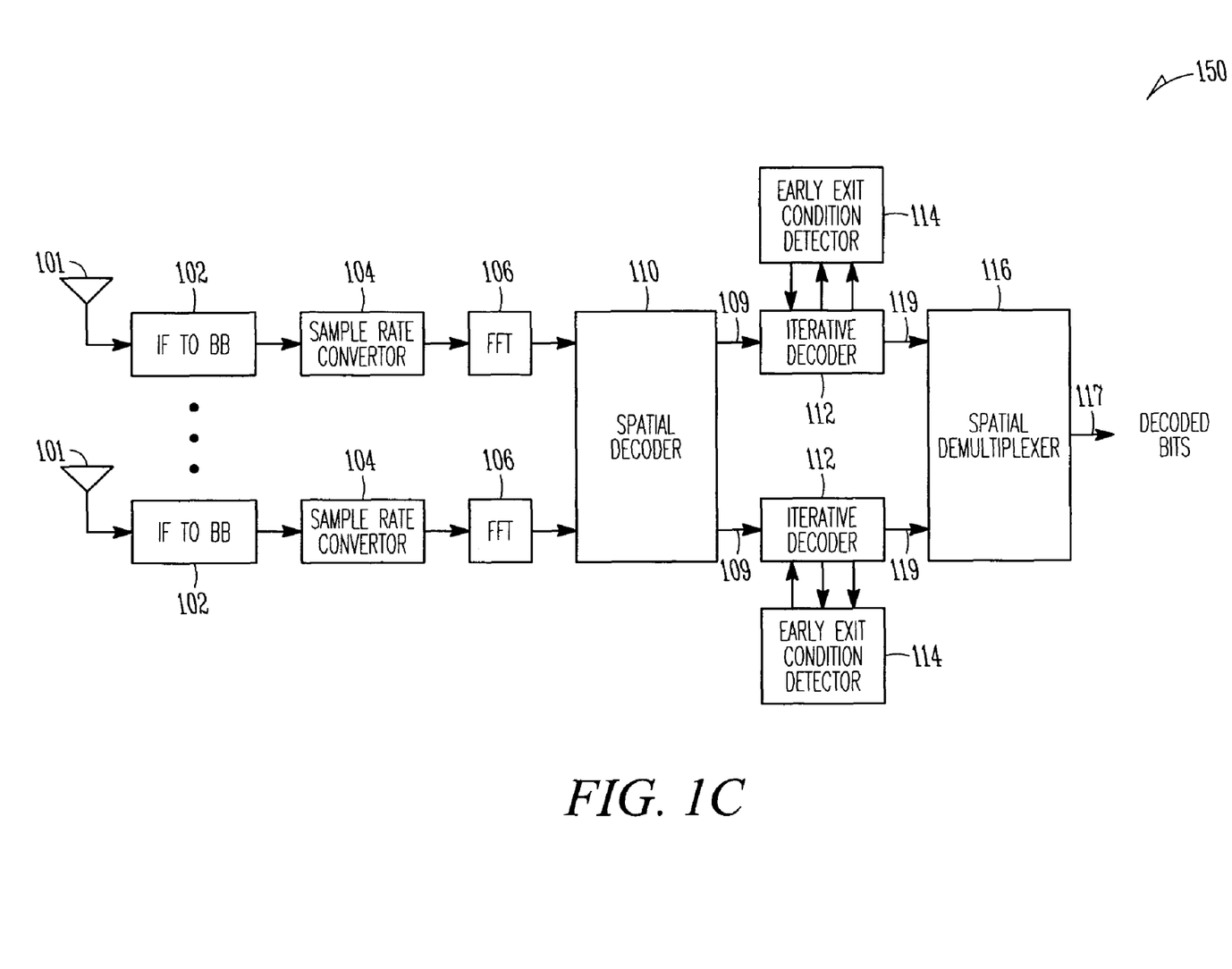

FIG. 1C is a block diagram of a MIMO OFDM receiver in accordance with some embodiments of the present invention. In these embodiments, MIMO OFDM receiver 150 comprises two or more sets of iterative decoders 112 and early-exit condition detectors 114 to generate decoded bits 119 from each output of spatial decoder 110. In these embodiments, MIMO OFDM receiver 150 comprises stream demultiplexer 116 to combine decoded bits 119 from each receive-signal path to generate a single stream of decoded bits 117. In these embodiments, the transmitting station may have horizontally encoded an input bit stream prior to transmission by demultiplexing the input bit stream into a plurality separate data streams for transmission by a corresponding transmit antenna.

Figure 2A:
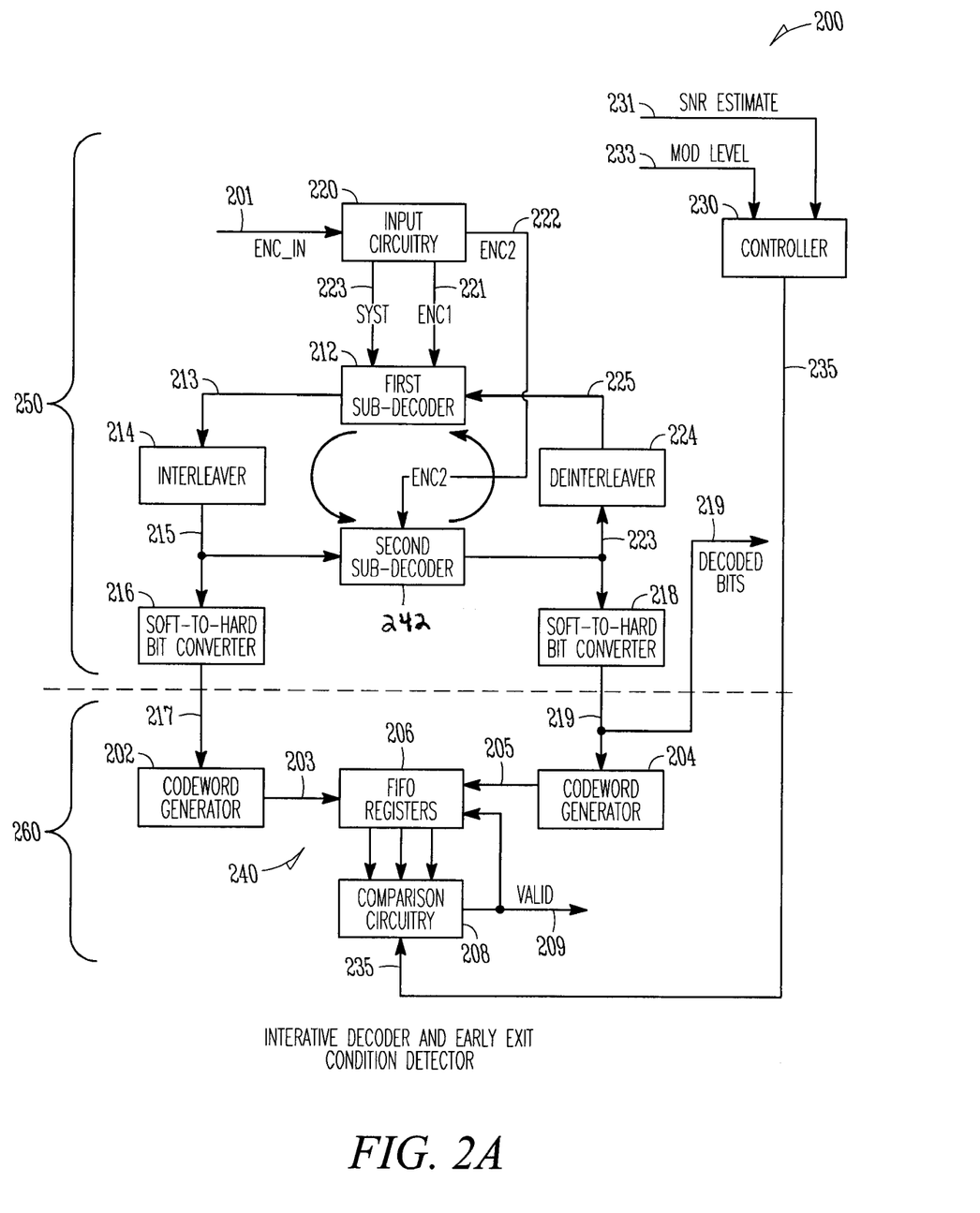
FIG. 2A is a block diagram of an iterative decoder and early-exit condition detector in accordance with some embodiments of the present invention.

FIG. 2A is a block diagram of an iterative decoder and early-exit condition detector in accordance with some embodiments of the present invention. Iterative decoder and early-exit condition detector 200 may be suitable for iterative decoder 112 (FIG. 1) and early-exit condition detector 114 (FIG. 1), although other configurations may also be suitable. Iterative decoder and early-exit condition detector 200 may comprise iterative decoder portion 250 and early-exit condition detector portion 260. Iterative decoder portion 250 may comprise input circuitry 220 to provide encoded soft bits 221 (enc1), encoded soft bits 222 (enc2) and encoded soft bits 223 (syst) from input soft bits 201. Input soft bits 201 may correspond to bit metrics 109 (FIGS. 1A, 1B and/or 1C) and may comprise a block of soft bits or a stream of soft bits. Iterative decoder portion 250 comprises first sub-decoder 212 and second sub-decoder 242 to perform decoding operations on encoded soft bits 221 (enc1), encoded soft bits 222 (enc2) and encoded soft bits 223 (syst).

Iterative decoder portion 250 may also comprise interleaver 214 to permute soft bits 213 generated by first sub-decoder 212 and first soft-to-hard bit converter 216 to convert permuted soft bits 215 provided by interleaver 214 to decoded bits 217. Iterative decoder portion 250 may also comprise second soft-to-hard bit converter 218 to convert soft bits 223 generated by second sub-decoder 242 to decoded bits 219 and deinterleaver 224 to permute soft bits 223 generated by second sub-decoder 242 and to provide permuted soft bits 225 for first sub-decoder 212. Interleaver 214 and deinterleaver 224 may perform opposite interleaving and deinterleaving operations, respectively.

Each decoding operation performed by first sub-decoder 212 may be considered a half-iteration, and each decoding operation performed by second sub-decoder 242 may also be considered a half-iteration. A set of decoding operations performed by first sub-decoder 212 and second sub-decoder 242 may be considered a full iteration of iterative decoder portion 250. During an initial half-iteration, first sub-decoder 212 operates using encoded soft bits 221 (enc1) and encoded soft bits 223 (syst), and second sub-decoder 242 operates using encoded soft bits 222 (enc2). During subsequent half-iterations, first sub-decoder 212 operates using permuted soft bits 225, and second sub-decoder 242 operates using permuted soft bits 215.

Early-exit condition detector portion 260 comprises first codeword generator 202 to generate first codeword 203 from decoded bits 217 generated from first sub-decoder 212 after one or more half-iterations of iterative decoder portion 250. Early-exit condition detector portion 260 also comprises second codeword generator 204 to generate second codeword 205 from decoded bits 219 generated from second sub-decoder 242 after an additional half-iteration of iterative decoder portion 250. Early-exit condition detector portion 260 may also comprise circuitry 240 to buffer and compare first codeword 203 and second codeword 205 to determine whether decoded bits 219 generated from second sub-decoder 242 are valid (i.e., properly decoded). In embodiments discussed in more detail below, iterative decoder and early-exit condition detector 200 may switch between double, triple and quadruple codeword matching depending on the SNR estimate of the received signals and/or the modulation level of the signals.

In some embodiments, when first codeword 203 and second codeword 205 match and when iterative decoder portion 250 is configured to perform double codeword matching, circuitry 240 may indicate that decoded bits 219 comprise valid decoded bits. Iterative decoder portion 250 may then be configured to refrain from performing further iterations for current input soft bits 201.

In some embodiments, when the first codeword 203 and second codeword 205 match and when iterative decoder portion 250 is configured to perform triple codeword matching, first codeword generator 202 may further generate a third codeword from an output of first sub-decoder 212 after another additional half-iteration of iterative decoder portion 250. Circuitry 240 may compare the third codeword with the first and second codewords and iterative decoder portion 250 may refrain from performing further iterations for current input soft bits 201 when the third codeword matches both the first and second codewords. Circuitry 240 may then indicate that decoded bits 219 comprise valid decoded bits. In some embodiments, circuitry 240 may comprise FIFO registers 206 and comparison circuitry 208, examples of which are discussed below.

In some embodiments, iterative decoder and early-exit condition detector 200 may further comprise controller 230 to set codeword matching level 235. Codeword matching level 235 may configure iterative decoder portion 250 and early-exit condition detector portion 260 to perform double, triple, and/or quadruple codeword matching based on SNR estimate 231 and/or modulation (MOD) level 233. In some embodiments, controller 230 may select the codeword matching level based on a table that indicates double, triple, and/or quadruple codeword matching for different modulation levels 233 and various SNR estimates 231. SNR estimate 231 and modulation level 233 for the current received signals may be provided by other portions of the receiver.

In some embodiments, controller 230 may set codeword matching level 235 to double codeword matching for SNR estimates at or below a predetermined value, and controller 230 may set codeword matching level 235 to triple codeword matching for SNRs above the predetermined value. The predetermined value for SNR estimate 231 may be selected from a table and may be further based on modulation level 233. In these embodiments, double codeword matching may be used for lower SNR estimates (i.e., more noisy signals) and triple codeword matching may be used for higher SNR estimates (i.e., less noisy signals). In the case of a modulation level such as 64 quadrature amplitude modulation (64-QAM), the predetermined value of the SNR estimate may range from 12 dB to 17 dB, although the scope of the invention is not limited in this respect. For example, for 64-QAM, double codeword matching may be used when the SNR estimate is below approximately 15 dB, and triple codeword matching may be used when the SNR estimate is above approximately 15 dB, although the scope of the invention is not limited in this respect as other predetermined values for the SNR estimate may also be used. In these embodiments, triple codeword matching may be used for less noisy signals (i.e., received signals with higher SNR estimates) because an incorrect double codeword match may be more likely (i.e., a false positive). Furthermore, double codeword matching may be used for more noisy signals (i.e., received signals with lower SNR estimates) because an incorrect double codeword match is less likely. As a result, the number of iterations performed by iterative decoder portion 250 may be reduced, especially in situations with lower SNR.

In some embodiments, controller 230 may use a table that indicates the predetermined SNR for selecting either double or triple codeword matching for each of a plurality of modulation levels. Different predetermined values for SNR estimate 231 may be selected by controller 230 for different modulation levels (e.g., QPSK, 16-PSK, 64-QAM, 256-QAM, etc).

In some alternate embodiments, triple-codeword matching may be also performed for more noisy signals (i.e., received signals with lower SNR) instead of double codeword matching, although the scope of the invention is not limited in this respect.

In some embodiments, controller 230 may set codeword matching level 235 to configure iterative decoder portion 250 and early-exit condition detector portion 260 to perform quadruple codeword matching for one or more predetermined modulation levels (e.g., 256-QAM). When the codeword matching level is set to quadruple codeword matching, second codeword generator 204 may generate a fourth codeword from an output of second sub-decoder 242 after another additional half-iteration of iterative decoder portion 250. Circuitry 240 may compare the fourth codeword to at least one of the first, second, or third codewords. Iterative decoder portion 250 may refrain from performing further iterations for current input soft bits 201 and early-exit condition detector portion 260 may indicate that decoded bits 219 comprise valid decoded bits when the fourth codeword matches the first, second, and third codewords. In some embodiments, controller 230 may configure iterative decoder portion 250 and early-exit condition detector portion 260 to perform quadruple codeword matching for a predetermined modulation level of 256-QAM independent of SNR estimate 231, although the scope of the invention is not limited in this respect.

In some embodiments, first sub-decoders 212 and second sub-decoder 242 may comprise elementary decoders, such as soft-in soft-out (SISO) decoders. In some embodiments, codewords 203 and 205 may comprise 16-bit or 32-bit codewords or checksums generated by performing a cyclic-redundancy-check (CRC) operation on decoded bits (i.e., either decoded bits 217 or decoded bits 219). In some embodiments, codeword generators 202 and 204 may use a 16-bit CRC polynomial for computing 16-bit codewords, while in other embodiments, codeword generators 202 and 204 may use a 32-bit CRC polynomial for computing 32-bit codewords, although the scope of the invention is not limited in this respect.

In some embodiments, iterative decoder portion 250 may comprise a block decoder for decoding blocks of input bits. In some other embodiments, iterative decoder portion 250 may comprise a convolutional decoder for decoding a stream of convolutionally encoded input bits. In some other embodiments, iterative decoder portion 250 may comprise a turbo decoder to decode bits encoded with a turbo-block code.

Although iterative decoder and early-exit condition detector 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of iterative decoder and early-exit condition detector 200 may refer to one or more processes operating on one or more processing elements.

Figure 2B:
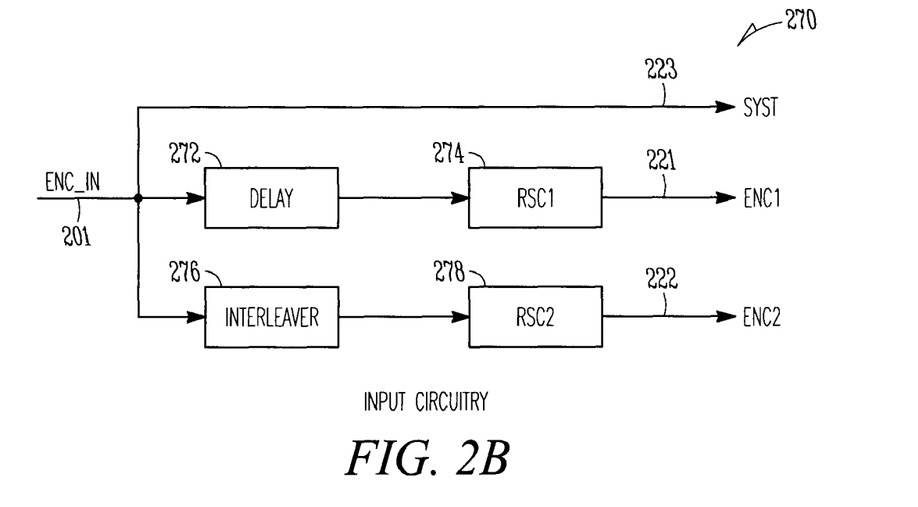
FIG. 2B is a block diagram of input circuitry for an iterative decoder suitable for use with some embodiments of the present invention.

FIG. 2B is a block diagram of input circuitry for an iterative decoder suitable for use with some embodiments of the present invention. Input circuitry 270 may be suitable for use as input circuitry 220 (FIG. 2A), although the scope of the invention is not limited in this respect. Input circuitry 270 may include delay element 272 to delay input soft bits 201 and first recursive systematic convolutional (RSC1) element 274 to operate on the delayed input bits to provide encoded soft bits 221 (enc1). Input circuitry 270 may also include interleaver 276 to permute input soft bits 201 and second RSC (RSC2) element 278 to provide encoded soft bits 222 (enc2). RSC elements 274 and 278 perform recursive systematic convolutional operations on their soft-bit inputs. Interleaver 276 performs an interleaving operation corresponding to the interleaving operation performed by interleaver 214 (FIG. 2A). As illustrated, encoded soft bits 223 (syst) may be provided directly from input soft bits 201.

Figure 2C:
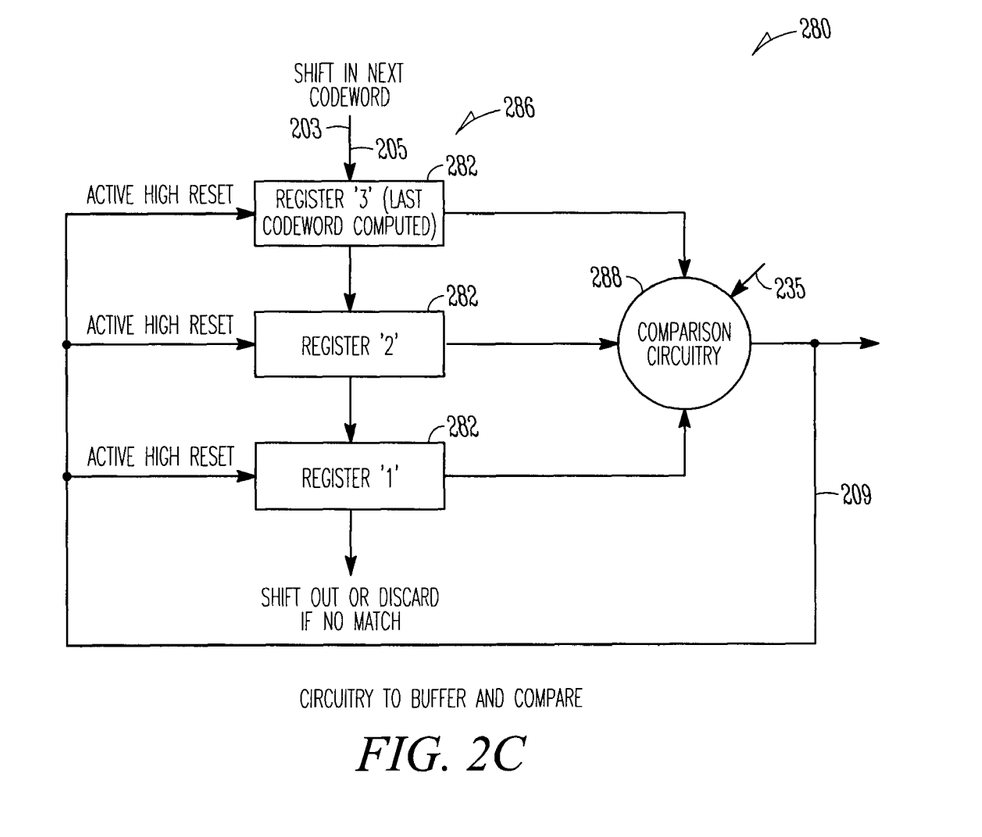
FIG. 2C is a block diagram of a first-in first-out (FIFO) register and comparison circuitry in accordance with some embodiments of the present invention.

FIG. 2C is a functional block diagram of a FIFO register and comparison circuitry 280 in accordance with some embodiments of the present invention. FIFO register 286 may be suitable for use as FIFO registers 206 (FIG. 2A) and comparison circuitry 288 may be suitable for use as comparison circuitry 208 (FIG. 2A) although other configurations of circuitry may also be suitable. FIFO register 286 may comprise two or more registers 282 that receive codewords, which may be shifted-in as illustrated. One codeword (either codeword 203 and 205 (FIG. 2A)) may be shifted into registers 282 after each half-iteration. Comparison circuitry 288 may compare the values of the codewords in two or more of registers 282. Comparison circuitry 288 may generate validity indicator 209 when two of the most recent values match when double codeword matching is set and when three of the values match when triple codeword matching is set. In some embodiments, validity indicator 209 may be an active high to reset registers 282, although the scope of the invention is not limited in this respect. In some embodiments, validity indicator 209 may be provided to external circuitry indicating that decoded bits 219 (FIG. 2A) are valid. In some embodiments, controller 230 (FIG. 2A) may provide codeword matching level 235 to comparison circuitry 288.

Figure 3:
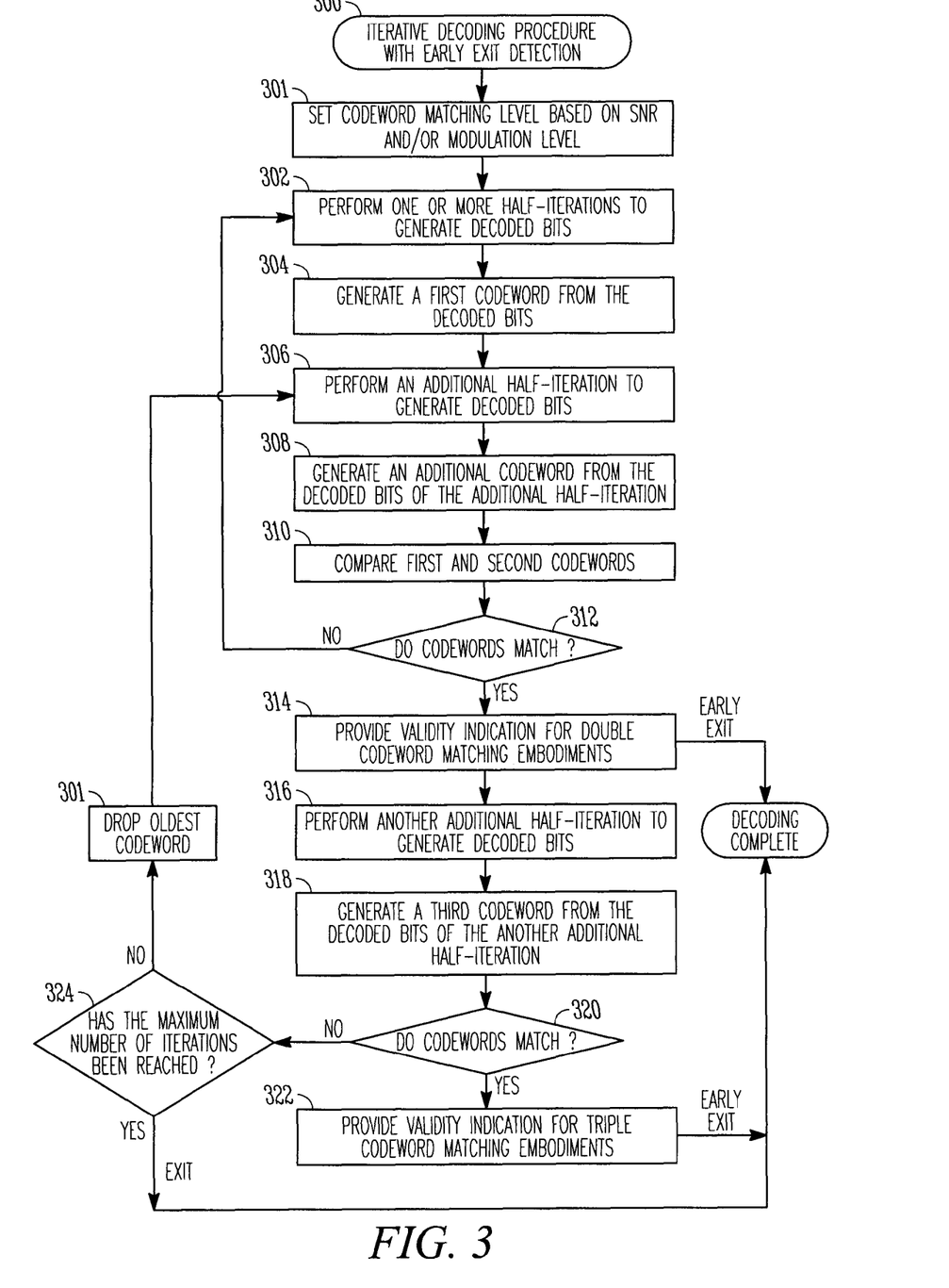
FIG. 3 is a flow chart of an iterative decoding procedure with early exit detection in accordance with some embodiments of the present invention.

FIG. 3 is a flow chart of an iterative decoding procedure with early exit detection in accordance with some embodiments of the present invention. Iterative decoding procedure 300 may be performed by iterative decoder and early-exit condition detector 200 (FIG. 2A), although other hardware and software configurations may also be used to perform procedure 300.

In operation 301, the codeword matching level may be set based on an SNR estimate and/or the modulation level. In some embodiments, the codeword matching level is set using a table, as discussed above. In some embodiments, controller 230 (FIG. 2A) may set the codeword matching level to one of double, triple, or quadruple codeword matching.

In operation 302, one or more half-iterations are performed to generate decoded bits. In some embodiments, operation 302 may comprise performing a single half iteration. In some embodiments, operation 302 may be performed by first sub-decoder 212 (FIG. 2A), although the scope of the invention is not limited in this respect.

Operation 304 comprises generating a codeword from the decoded bits generated in operation 302. In some embodiments, operation 304 may be performed by first codeword generator 202 (FIG. 2A), although the scope of the invention is not limited in this respect. In some embodiments, the codeword generated in operation 304 may be shifted into FIFO registers 206 (FIG. 2A), although the scope of the invention is not limited in this respect.

Operation 306 comprises performing an additional half-iteration to generate decoded bits. In some embodiments, operation 306 may be performed by second sub-decoder 242 (FIG. 2A), although the scope of the invention is not limited in this respect.

Operation 308 comprises generating an additional codeword from the decoded bits generated in operation 306. In some embodiments, operation 308 may be performed by second codeword generator 204 (FIG. 2A) and the codeword may be shifted into FIFO registers 206 (FIG. 2A), although the scope of the invention is not limited in this respect.

Operation 310 comprises comparing the first and second codewords, and operation 312 comprises determining if the codewords match. In some embodiments, comparison circuitry 208 (FIG. 2A) may perform operations 310 and 312. When the codewords match, operation 314 is performed, and when the codewords do not match, operations 302 through 312 may be repeated.

When double codeword matching was set in operation 301, operation 314 comprises providing a validity indicator and exiting from the decoding process. When double codeword matching was not selected, operation 316 is performed.

Operation 316 comprises performing an additional half-iteration to generate decoded bits. In some embodiments, operation 316 may be performed by first sub-decoder 212 (FIG. 2A) using the decoded bits generated in operation 306 after deinterleaving, although the scope of the invention is not limited in this respect.

Operation 318 comprises generating a third codeword from the decoded bits generated in operation 316 and shifting the third codeword into FIFO registers 206 (FIG. 2A), although the scope of the invention is not limited in this respect.

Operation 320 comprises determining whether the first, second, and third codewords match. When the first, second, and third codewords match, operation 322 may be performed. Operation 322 comprises providing a validly indicator when the first, second, and third codewords match when triple codeword matching was selected in operation 301 and exiting from the decoding process.

When the codewords do not match in operation 320, operation 324 may be performed. Operation 324 determines if the maximum number of iterations for the decoder has been reached. If the maximum number has not been reached, operations 306 through 322 may be repeated. If the maximum number has been reached, the decoder may exit the decoding process. In some embodiments, the maximum number of iterations may range from eight to ten, although the scope of the invention is not limited in this respect as the maximum number of iterations may vary significantly based on system parameters and requirements.

When quadruple codeword matching is set in operation 301, operations 316, 318, and 320 may be performed after operation 320 to generate and compare a fourth codeword. In these embodiments, a validity indication may be provided when the fourth codeword matches the first, second, and third codewords and the decoder may exit the decoding process.

Although the individual operations of procedure 300 are illustrated and described as separate operations, one or more of the individual operations may be performed concurrently, and nothing requires that the operations be performed in the order illustrated.

In some embodiments, receiver 100 (FIG. 1A), receiver 130 (FIG. 1B) and/or receiver 150 (FIG. 1C) may be part of a wireless communication device that communicates orthogonal frequency division multiplexed (OFDM) communication signals over a multicarrier communication channel. The multicarrier communication channel may be within a predetermined frequency spectrum and may comprise a plurality of orthogonal subcarriers. In some embodiments, the multicarrier signals may be defined by closely spaced OFDM subcarriers. In some other embodiments, receiver 100 (FIG. 1A), receiver 130 (FIG. 1B) and/or receiver 150 (FIG. 1C) may communicate in accordance with a multiple access technique, such as orthogonal frequency division multiple access (OFDMA), although the scope of the invention is not limited in this respect.

In some embodiments, receiver 100 (FIG. 1A), receiver 130 (FIG. 1B) and/or receiver 150 (FIG. 1C) may be part of a communication station, such as wireless local area network (WLAN) communication station including a Wireless Fidelity (WiFi) communication station, an access point (AP) or a mobile station (MS). In some other embodiments, receiver 100 (FIG. 1A), receiver 130 (FIG. 1B) and/or receiver 150 (FIG. 1C) may be part of a broadband wireless access (BWA) network communication station, such as a WiMax communication station, although the scope of the invention is not limited in this respect as receiver 100 may be part of almost any wireless communication device.

In some embodiments, receiver 100 (FIG. 1A), receiver 130 (FIG. 1B) and/or receiver 150 (FIG. 1C) may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some embodiments, the frequency spectrums for the communication signals received by receiver 100 (FIG. 1A), receiver 130 (FIG. 1B) and/or receiver 150 (FIG. 1C) may comprise either a 5 gigahertz (GHz) frequency spectrum or a 2.4 GHz frequency spectrum. In these embodiments, the 5 gigahertz (GHz) frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some BWA network embodiments, the frequency spectrum for the communication signals may comprise frequencies between 2 and 11 GHz, although the scope of the invention is not limited in this respect.

In some embodiments, receiver 100 (FIG. 1A), receiver 130 (FIG. 1B) and/or receiver 150 (FIG. 1C) may receive signals in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for wireless local area networks, although the scope of the invention is not limited in this respect as they may also be suitable to transmit and/or receive communications in accordance with other techniques and standards. In some broadband wireless access network embodiments, receiver 100 (FIG. 1A), receiver 130 (FIG. 1B) and/or receiver 150 (FIG. 1C) may receive signals in accordance with the IEEE 802.16-2004 and the IEEE 802.16(e) standards for wireless metropolitan area networks (WMANs) including variations and evolutions thereof, although the scope of the invention is not limited in this respect as they may also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions. Some embodiments relate to the IEEE 802.11e proposed enhancement to the IEEE 802.11 WLAN specification that will include quality-of-service (QoS) features, including the prioritization of data, voice, and video transmissions.

Antennas 101 (FIGS. 1A, 1B and 1C) may comprise one or more directional or omnidirectional antennas, including, for example, dipole antennas, monopole antennas, patch antennas, loop antennas, microstrip antennas, or other types of antennas suitable for transmission of RF signals. In some multiple-input, multiple-output (MIMO) embodiments, two or more antennas may be used. In some embodiments, instead of two or more antennas, a single antenna with multiple apertures may be used. In these embodiments, each aperture may be considered a separate antenna. In some embodiments, each antenna may be effectively separated to take advantage of spatial diversity and the different channel characteristics that may result between each of antennas 101 (FIGS. 1A, 1B and 1C) and another wireless communication device. In some embodiments, antennas 101 (FIGS. 1A, 1B and 1C) may be separated by up to $\frac{1}{10}$ of a wavelength or more.

Although iterative decoder and early-exit condition detector 200 (FIG. 2A) is described as being suitable for multicarrier and OFDM embodiments, iterative decoder and early-exit condition detector 200 (FIG. 2A) may also be suitable for use in receivers that receive spread-spectrum signals, although the scope of the invention is not limited in this respect. Iterative decoder and early-exit condition detector 200 (FIG. 2A) may also be suitable for use with receivers that receive signals in accordance with standards such as the Pan-European mobile system standard referred to as the Global System for Mobile Communications (GSM), the Universal Mobile Telephone System (UMTS) standard for the next generation of GSM, which may, for example, implement communication techniques in accordance with 2.5 G and 3 G wireless standards (see 3GPP Technical Specification, Version 3.2.0, March 2000), and or the enhanced data for GSM evolution (EDGE) standards (see 3GPP Technical Specification, Version 3.2.0, March 2000), although the scope of the invention is not limited in this respect. Iterative decoder and early-exit condition detector 200 (FIG. 2A) may also be suitable for use with receivers that receive signals in accordance with short-range wireless standards such as the Bluetooth™ short-range digital communication protocol. Iterative decoder and early-exit condition detector 200 (FIG. 2A) may also be suitable for use with receivers that receive signals in accordance with an ultra-wideband (UWB) communication technique where a carrier frequency is not used.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Embodiments of the invention may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An iterative decoder and early-exit condition detector comprising:

a first codeword generator to generate a first codeword from decoded bits generated from a first sub-decoder after one or more half-iterations of the iterative decoder;

a second codeword generator to generate a second codeword from decoded bits generated from a second sub-decoder after an additional half-iteration of the iterative decoder; and circuitry to buffer and compare the first and second codewords to determine whether the decoded bits generated from the second sub-decoder are valid; and a controller to set a codeword matching level to configure the iterative decoder to perform one of double or triple codeword matching based on an estimated signal-to-noise ratio (SNR), wherein when the first and second codewords match and when the codeword matching level is set to double codeword matching:

the circuitry to buffer and compare indicates that the decoded bits comprise valid decoded bits; and the iterative decoder refrains from performing further iterations for current input bits, and wherein when the codeword matching level is set to triple codeword matching:

the first codeword generator generates a third codeword from an output of the first sub-decoder after another additional half-iteration of the iterative decoder;

the circuitry to buffer and compare compares the third codeword to both the first and second codewords; and the iterative decoder refrains from performing further iterations for the current input bits and indicates that the decoded bits comprise valid decoded bits when the third codeword matches both the first and second codewords.

2. The iterative decoder of claim 1 wherein the iterative decoder is one of:

a block decoder for decoding blocks of input bits;

a convolutional decoder for decoding a stream of convolutionally encoded input bits; or a turbo decoder to decode bit encoded with a turbo-block code.

3. An iterative decoder and early-exit condition detector comprising:

a first codeword generator to generate a first codeword from decoded bits generated from a first sub-decoder after one or more half-iterations of the iterative decoder;

a second codeword generator to generate a second codeword from decoded bits generated from a second sub-decoder after an additional half-iteration of the iterative decoder;

circuitry to buffer and compare the first and second codewords to determine whether the decoded bits generated from the second sub-decoder are valid; and a controller to set a codeword matching level to configure the iterative decoder to perform either double or triple codeword matching based on an estimated signal-to-noise ratio (SNR), wherein the controller sets the codeword matching level to double codeword matching for SNR estimates at or below a predetermined value, wherein the controller sets the codeword matching level to triple codeword matching for SNRs above the predetermined value, and wherein codeword matching level is selected from a table based on the SNR estimate and a modulation level.

4. The iterative decoder of claim 3 wherein the controller further sets the codeword matching level to configure the iterative decoder to perform quadruple codeword matching for a predetermined modulation level, and wherein when the codeword matching level is set to quadruple codeword matching:

the second codeword generator generates a fourth codeword from an output of the second sub-decoder after another additional half-iteration of the iterative decoder;

the circuitry to buffer and compare compares the fourth codeword to at least one of the first, second, or third codewords; and the iterative decoder refrains from performing further iterations for the current input bits and indicates that the decoded bits generated from second sub-decoder comprise valid decoded bits when the fourth codeword matches the first, second and third codewords.

5. The iterative decoder of claim 4 wherein the controller configures the iterative decoder to perform quadruple codeword matching for a predetermined modulation level of 256-QAM independent of the SNR estimate.

6. An iterative decoder and early-exit condition detector comprising:

a first codeword generator to generate a first codeword from decoded bits generated from a first sub-decoder after one or more half-iterations of the iterative decoder;

a second codeword generator to generate a second codeword from decoded bits generated from a second sub-decoder after an additional half-iteration of the iterative decoder;

circuitry to buffer and compare the first and second codewords to determine whether the decoded bits generated from the second sub-decoder are valid; and a controller to set a codeword matching level to configure the iterative decoder to perform either double or triple codeword matching based on an estimated signal-to-noise ratio (SNR), wherein the circuitry to buffer and compare comprises:

a first-in first-out (FIFO) buffer comprising registers to store the codewords; and comparison circuitry to compare values in two or more of the registers and generate a validity indicator when two most recent of the values match when the iterative decoder is configured for double codeword matching and three of the values match when the iterative decoder is configured for triple codeword matching.

7. The iterative decoder of claim 6 wherein the iterative decoder further comprises:

an interleaver to permute soft bits generated by the first sub-decoder;

a first soft-to-hard bit converter to convert permuted soft bits provided by the interleaver to decoded bits for use by the first codeword generator;

a second soft-to-hard bit converter to convert soft bits generated by the second sub-decoder to decoded bits for use by the second codeword generator; and a deinterleaver to permute the soft bits generated by the second sub-decoder and to provide permuted soft bits to the first sub-decoder.

8. A method of generating decoded bits comprising:

setting a codeword matching level to one of double or triple codeword matching based on an estimated signal-to-noise ratio (SNR);

generating a first codeword from decoded bits generated after one or more half-iterations of an iterative decoder;

generating a second codeword from decoded bits generated after an additional half-iteration of the iterative decoder; and comparing the first and second codewords to determine whether the decoded bits are valid, wherein when the first and second codewords match and when triple codeword matching is set, the method further comprises:
   generating a third codeword after another additional half-iteration of the iterative decoder;
   comparing the third codeword to both the first and second codewords; and
   refraining from performing further iterations for current input bits when the third codeword matches both the first and second codewords and indicating that the decoded bits comprise valid decoded bits.

9. A method of generating decoded bits comprising:
setting a codeword matching level to one of double or triple codeword matching based on an estimated signal-to-noise ratio (SNR);
generating a first codeword from decoded bits generated after one or more half-iterations of an iterative decoder;
generating a second codeword from decoded bits generated after an additional half-iteration of the iterative decoder; and
comparing the first and second codewords to determine whether the decoded bits are valid,
wherein the codeword matching level is set to double codeword matching for SNR estimates at or below a predetermined value,
wherein the codeword matching level is set to triple codeword matching for SNRs above the predetermined value, and
wherein the method further comprises selecting the codeword matching level from a table based on the SNR estimate and on a modulation level.

10. A receiver comprising:
demapping circuitry to generate bit metrics from a plurality of frequency-domain signals; and
an iterative decoder to generate a first codeword from decoded bits generated after one or more half-iterations of the iterative decoder operating on the bit metrics, to generate a second codeword from decoded bits generated after an additional half-iteration of the iterative decoder, and to compare the first and second codewords to determine whether the decoded bits are valid,
wherein the iterative decoder is configured to set a codeword matching level to configure the iterative decoder to perform one of double or triple codeword matching based on an estimated signal-to-noise ratio (SNR) of received signals, and
wherein the iterative decoder comprises:
   a first sub-decoder;
   a first codeword generator to generate the first codeword from decoded bits generated from the first sub-decoder after one or more half-iterations of the iterative decoder;
   a second sub-decoder;
   a second codeword generator to generate the second codeword from decoded bits generated from the second sub-decoder after the additional half-iteration of the iterative decoder; and
   circuitry to buffer and compare the first and second codewords to determine whether the decoded bits generated from the second sub-decoder are valid,
wherein when the first and second codewords match and when the iterative decoder is configured to perform double codeword matching:
   the circuitry to buffer and compare indicates that the decoded bits comprise valid decoded bits; and
   the iterative decoder refrains from performing further iterations for current input bits,
wherein when the first and second codewords match and when the iterative decoder is configured to perform triple codeword matching:
   the first codeword generator further generates a third codeword from an output of the first sub-decoder after another additional half-iteration of the iterative decoder;
   the circuitry to buffer and compare compares the third codeword to both the first and second codewords; and
   the iterative decoder refrains from performing further iterations for current input bits when the third codeword matches both the first and second codewords and indicates that the decoded bits comprise valid decoded bits.

11. The receiver of claim 10 wherein the iterative decoder further comprising a controller to set the codeword matching level to configure the iterative decoder to perform either double or triple codeword matching based on the estimated SNR,
wherein the controller sets the codeword matching level to double codeword matching for SNR estimates at or below a predetermined value,
wherein the controller sets the codeword matching level to triple codeword matching for SNRs above the predetermined value, and
wherein codeword matching level is selected from a table based on the SNR estimate and a modulation level.

12. The receiver of claim 10 wherein the receiver is an orthogonal frequency division multiplexed (OFDM) receiver.

* * * * *